(12) United States Patent
King et al.

(10) Patent No.: US 12,547,845 B2
(45) Date of Patent: Feb. 10, 2026

(54) SYSTEMS, METHODS, AND APPARATUSES FOR IMPLEMENTING NATURAL LANGUAGE PROCESSING TO DETERMINE NATURAL LANGUAGE FROM COMPUTER PROGRAMMING LANGUAGE IN AN ELECTRONIC ENVIRONMENT

(71) Applicant: BANK OF AMERICA CORPORATION, Charlotte, NC (US)

(72) Inventors: Bryan King, Huntersville, NC (US); Andrea M. Weisberger, Jacksonville, FL (US); Kristi A. Perry-Weaver, Waxahachie, TX (US); Bhavna Agrawal, Plano, TX (US); Jitesh K. Vijay, Princeton, NJ (US); Divya Ilango Arun, Concord, NC (US); Arjun Thimmareddy, Charlotte, NC (US); Virinchi Ande, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 202 days.

(21) Appl. No.: 18/225,441

(22) Filed: Jul. 24, 2023

(65) Prior Publication Data
US 2025/0036882 A1    Jan. 30, 2025

(51) Int. Cl.
G06F 8/73    (2018.01)
G06F 40/30    (2020.01)
(Continued)

(52) U.S. Cl.
CPC ............ G06F 40/40 (2020.01); G06F 3/0481 (2013.01)

(58) Field of Classification Search
CPC ...................................................... G06F 40/20
See application file for complete search history.

(56) References Cited

U.S. PATENT DOCUMENTS 5,197,005 A    3/1993    Shwartz
5,924,089 A    7/1999    Mocek
(Continued)

FOREIGN PATENT DOCUMENTS

KR    102404037 B1    6/2022

OTHER PUBLICATIONS

Liu, Xiao, and Dinghao Wu. "From natural language to programming language." Innovative methods, user-friendly tools, coding, and design approaches in people-oriented programming. IGI Global Scientific Publishing, 2018. 110-130. (Year: 2018).*

(Continued)

*Primary Examiner* — Jialong He
(74) *Attorney, Agent, or Firm* — Moore & Van Allen PLLC; Lauren Stokes

(57) ABSTRACT

Systems, computer program products, and methods are described herein for implementing natural language processing to determine natural language from computer programming language in an electronic environment. The present disclosure is configured to identify at least one change request associated with at least one computer program to: identify at least one modification to the at least one computer program; apply the at least one change request and the at least one modification to a natural language processor (NLP); generate a natural language interpretation of the at least one modification; generate a modification interpretation interface component, wherein the modification interpretation interface component comprises a data packet of the natural language interpretation; and transmit the modification interpretation interface component to a user device associated with the at least one change request and configure a graphical user interface (GUI) of the user device with the modification interpretation interface component.

17 Claims, 9 Drawing Sheets

(51) Int. Cl.
*G06F 40/40* (2020.01)
*G06F 3/0481* (2022.01)

(56) References Cited

U.S. PATENT DOCUMENTS

| | | | |
|---|---|---|---|
| 8,892,419 | B2 | 11/2014 | Lundberg |
| 9,443,005 | B2 | 9/2016 | Khandekar |
| 9,715,524 | B1 | 7/2017 | Zhang |
| 9,805,717 | B2 | 10/2017 | Panemangalore |
| 10,169,337 | B2 | 1/2019 | Bird |
| 10,303,683 | B2 | 5/2019 | Anderson |
| 10,515,154 | B2 | 12/2019 | Suenbuel |
| 10,552,541 | B1 | 2/2020 | Dreher |
| 10,843,080 | B2 | 11/2020 | Hsiao |
| 10,984,041 | B2 | 4/2021 | Bedadala |
| 11,086,601 | B2 | 8/2021 | Doyle |
| 11,429,346 | B2 | 8/2022 | Kothari |
| 11,468,406 | B2 | 10/2022 | Padmanabhan |
| 2008/0235199 | A1 | 9/2008 | Li |
| 2014/0163962 | A1 | 6/2014 | Castelli |
| 2018/0191808 | A1 | 7/2018 | Bhaya |
| 2018/0210883 | A1 | 7/2018 | Ang |
| 2019/0164095 | A1* | 5/2019 | Argyros ............. G06Q 10/0633 |
| 2022/0156466 | A1* | 5/2022 | Gill ........................ G06N 5/022 |
| 2024/0354065 | A1* | 10/2024 | Stephens .................. G06F 8/30 |
| 2024/0362017 | A1* | 10/2024 | Parhi ......................... G06F 8/73 |

OTHER PUBLICATIONS

Khan, Junaed Younus, and Gias Uddin. "Automatic code documentation generation using gpt-3." Proceedings of the 37th IEEE/ACM International Conference on Automated Software Engineering. 2022. (Year: 2022).*

Arthur, Menaka Pushpa. "Automatic source code documentation using code summarization technique of NLP." Procedia Computer Science 171 (2020) (Year: 2020).*

WebForms, "Introduction to ASP.NET and Web Forms", [online] https://www.cs.wmich.edu/~alfuqaha/summer11/cs5950/index.html, published in 2011. (Year: 2011).*

* cited by examiner

SYSTEMS, METHODS, AND APPARATUSES FOR IMPLEMENTING NATURAL LANGUAGE PROCESSING TO DETERMINE NATURAL LANGUAGE FROM COMPUTER PROGRAMMING LANGUAGE IN AN ELECTRONIC ENVIRONMENT

TECHNOLOGICAL FIELD

Example embodiments of the present disclosure relate to implementing natural language processing to determine natural language from computer programming language in an electronic environment.

BACKGROUND

Computer programs and their associated developments/changes occur more and more in today's computer-centric world. Such computer programs play a vital role in humans' day to day lives today, and when those computer programs have identified problems, it becomes very difficult to not only fix those problems but also to relay how the problems have been fixed to laypeople. Thus, there exists a need for a system to accurately, efficiently, and dynamically determine natural language from computer programming language both for the purpose of fixing computer programs and for the purpose of automatically describing how the computer programs have been fixed.

Applicant has identified a number of deficiencies and problems associated with determining natural language from computer programming language in an electronic environment. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for implementing natural language processing to determine natural language from computer programming language in an electronic environment.

In one instance, a system for implementing natural language processing (NLP) to determine natural language from computer programming language is provided. In some embodiments, the system may comprise: a memory device with computer-readable program code stored thereon; at least one processing device, wherein executing the computer-readable code is configured to cause the at least one processing device to perform the following operations: identify at least one change request associated with at least one computer program; identify at least one modification to the at least one computer program; apply the at least one change request and the at least one modification to a natural language processor (NLP) engine; generate, by the NLP engine, a natural language interpretation of the at least one modification to the at least one computer program; generate, based on the natural language interpretation of the at least one modification, a modification interpretation interface component, wherein the modification interpretation interface component comprises a data packet of the natural language interpretation and an identifier of the at least one modification to the at least one computer program; and transmit the modification interpretation interface component to a user device associated with the at least one change request and configure a graphical user interface (GUI) of the user device with the modification interpretation interface component.

In some embodiments, the system may further comprise: generate a modification interpretation database, wherein the modification interpretation database comprises at least one modification and at least one associated natural language interpretation of the at least one modification; identify at least one new change request; analyze the modification interpretation database based on the at least one new change request; link the at least one new change request to the at least one associated natural language interpretation; and identify at least one suggested modification based on the at least one modification associated with the at least one associated natural language interpretation linked to the at least one new change request. In some embodiments, the system may further comprise: update the modification interpretation database with at least one suggested location within the at least one program for the at least one modification; and generate a suggested modification interface component, wherein the suggested modification interface component comprises the at least one suggested modification and the at least one suggested location for the at least one modification the at least one suggested modification is based on. In some embodiments, the system may further comprise: link, based on the natural language interpretation, the natural language interpretation to the at least one modification; and store the natural language interpretation and the at least one modification in the modification interpretation database.

In some embodiments, the system may further comprise: collect a first set of change requests, wherein the first set of change requests is collected in a first period; collect a first set of modifications associated with the first set of change requests; generate a first training dataset based on the first set of change requests and first set of modifications; apply the first training dataset to the NLP engine at a second period; and train, based on applying the first training dataset to the NLP engine, the NLP engine. In some embodiments, the first training dataset comprises a first set of pre-tagged attributes of the first set of modifications, and wherein the first set of pre-tagged attributes comprise at least one of an associated with the first set of change requests or a disassociation with the first set of change requests. In some embodiments, the NLP engine is trained based on at least one set of previous modifications to the at least one computer program, and wherein the at least one set of previous modifications is generated by at least one developer, at least one developer team, or a plurality of developer teams. In some embodiments, the NLP engine is trained based on at least one set of previous modifications for a plurality of computer programs, wherein the plurality of computer programs comprises a plurality of programming languages.

In some embodiments, the system may further comprise: generate an overlay modification interpretation interface component, wherein the overlay modification interpretation interface component comprises a data packet of the natural language interpretation for the at least one modification of the at least one computer program and a modification location identifier of the at least one modification; transmit the overlay modification interpretation interface component to the user device associated with the at least one change request; identify at least one user interaction on the GIU of the user device and an associated interaction location identifier of the at least one user interaction; and dynamically configure the GUI of the user device with the overlay modification interpretation interface component when the modification location identifier and the interaction location identifier match.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
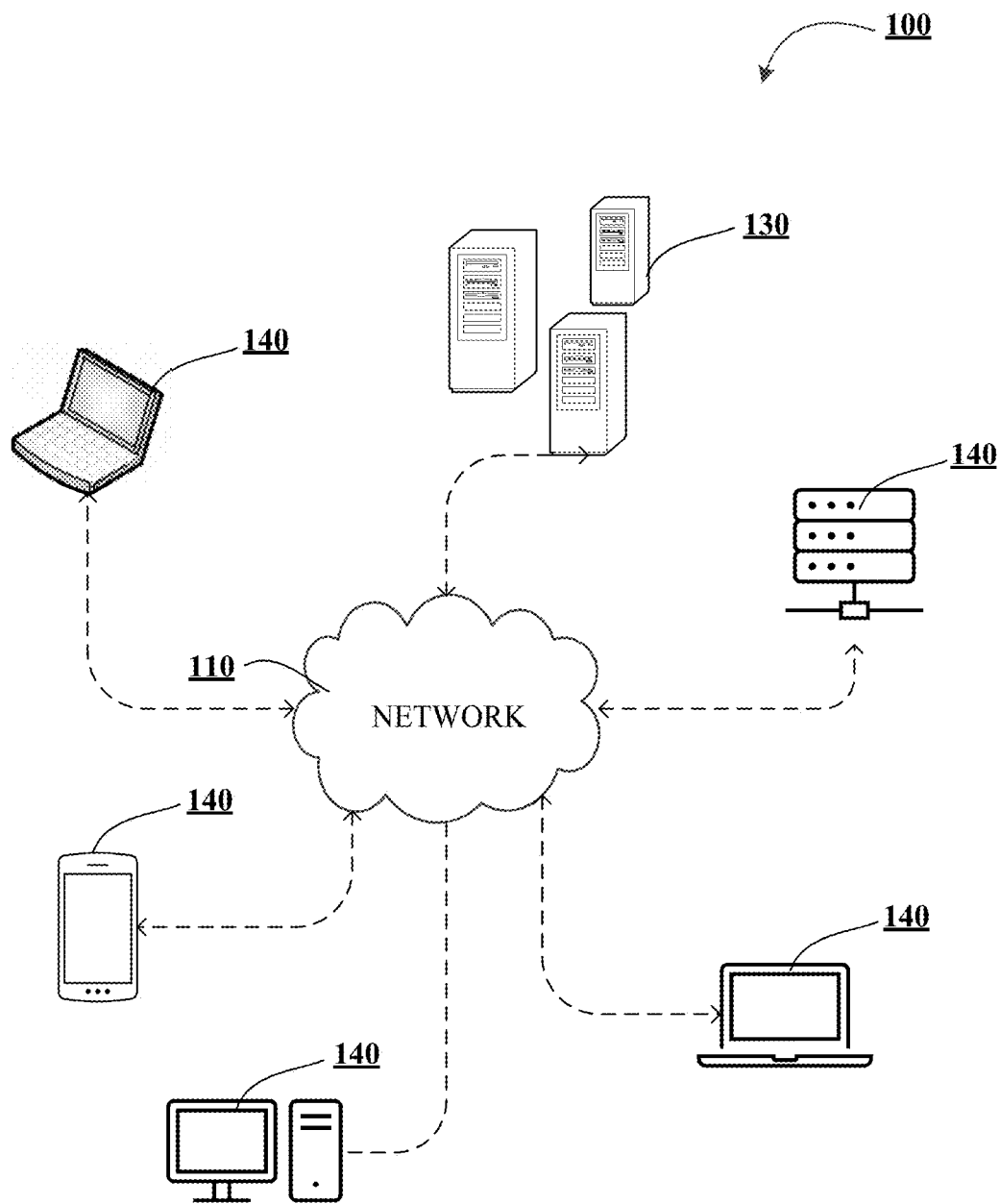
Figure 1B:
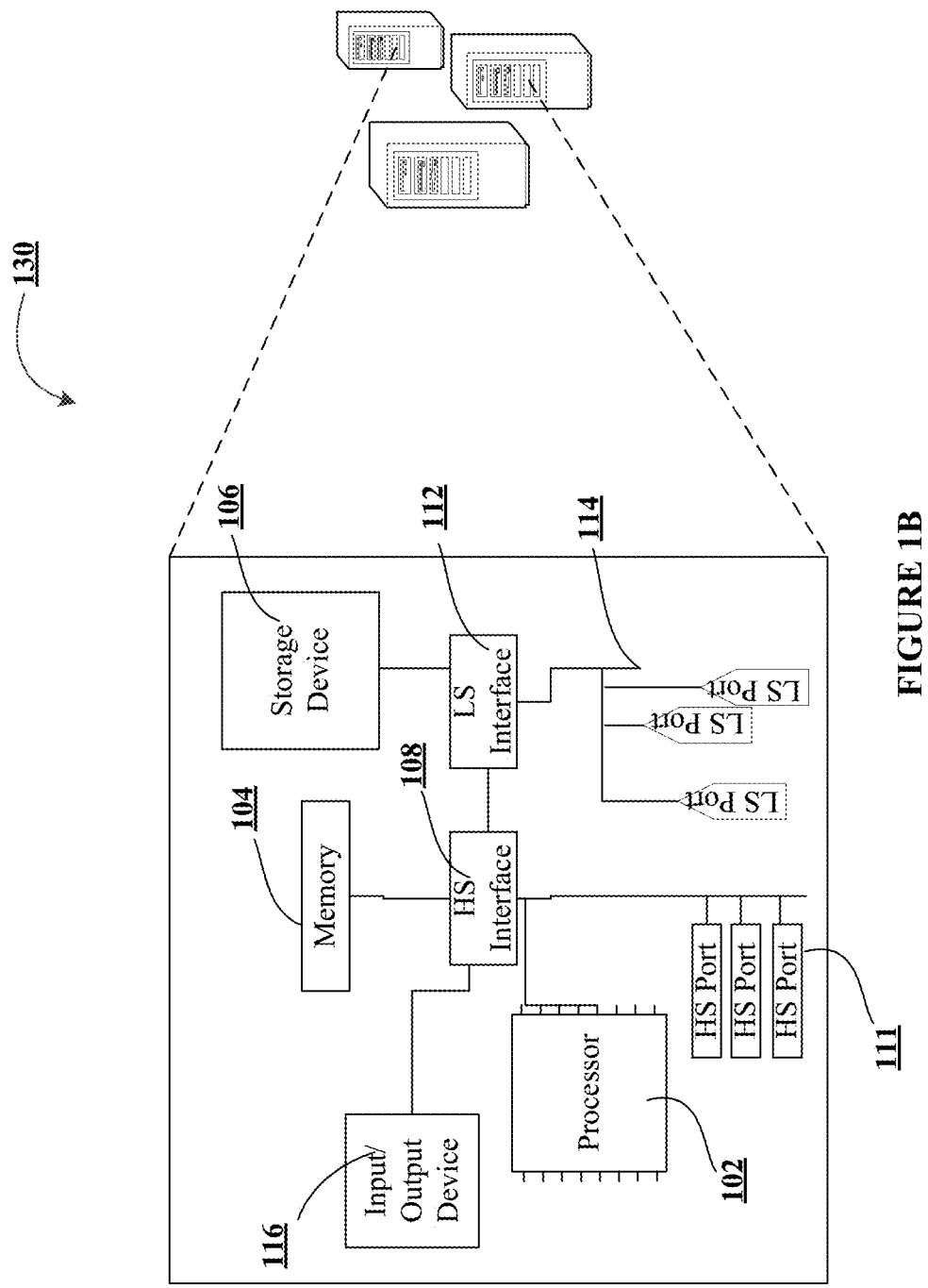
Figure 1C:
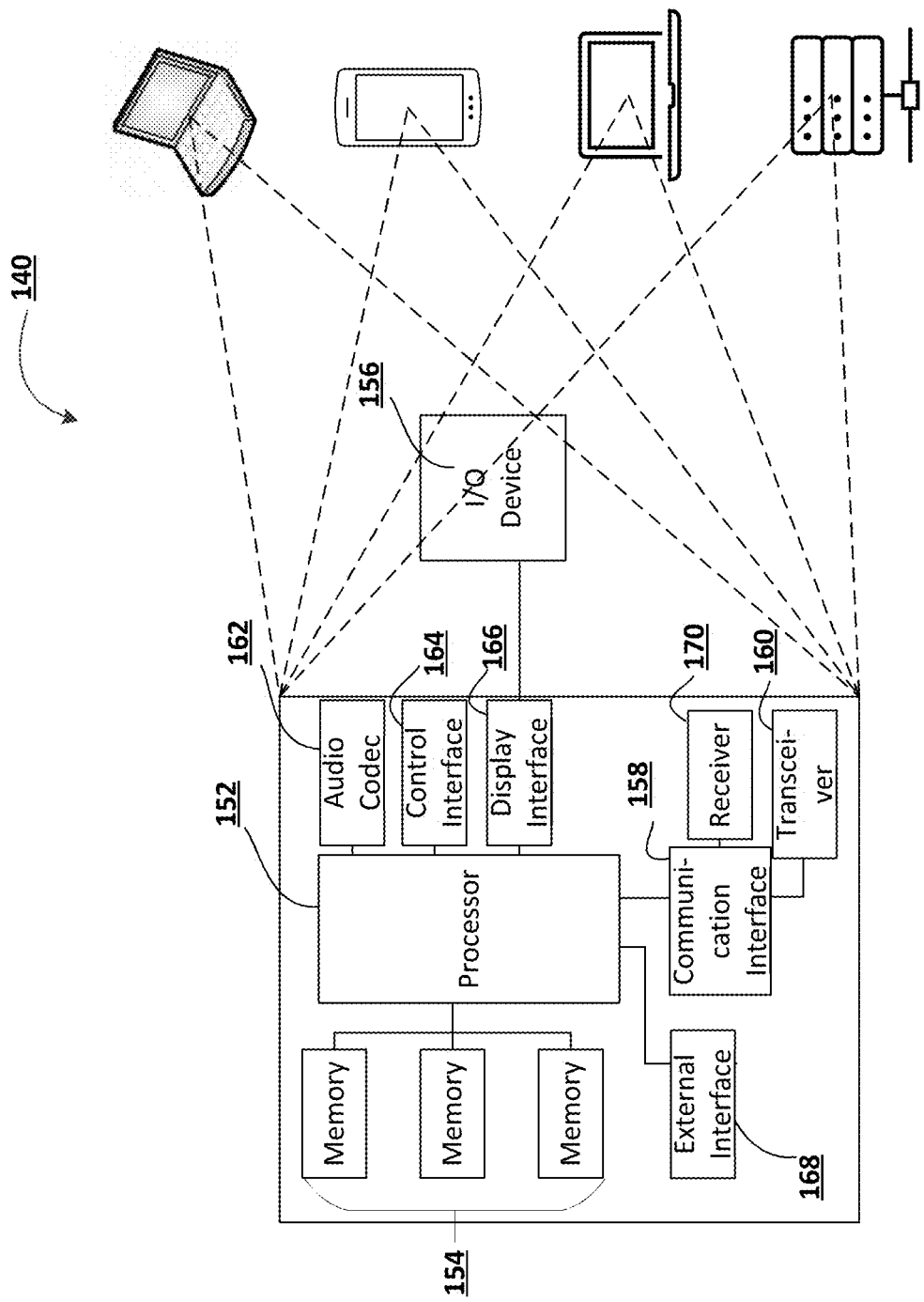
Figure 2:
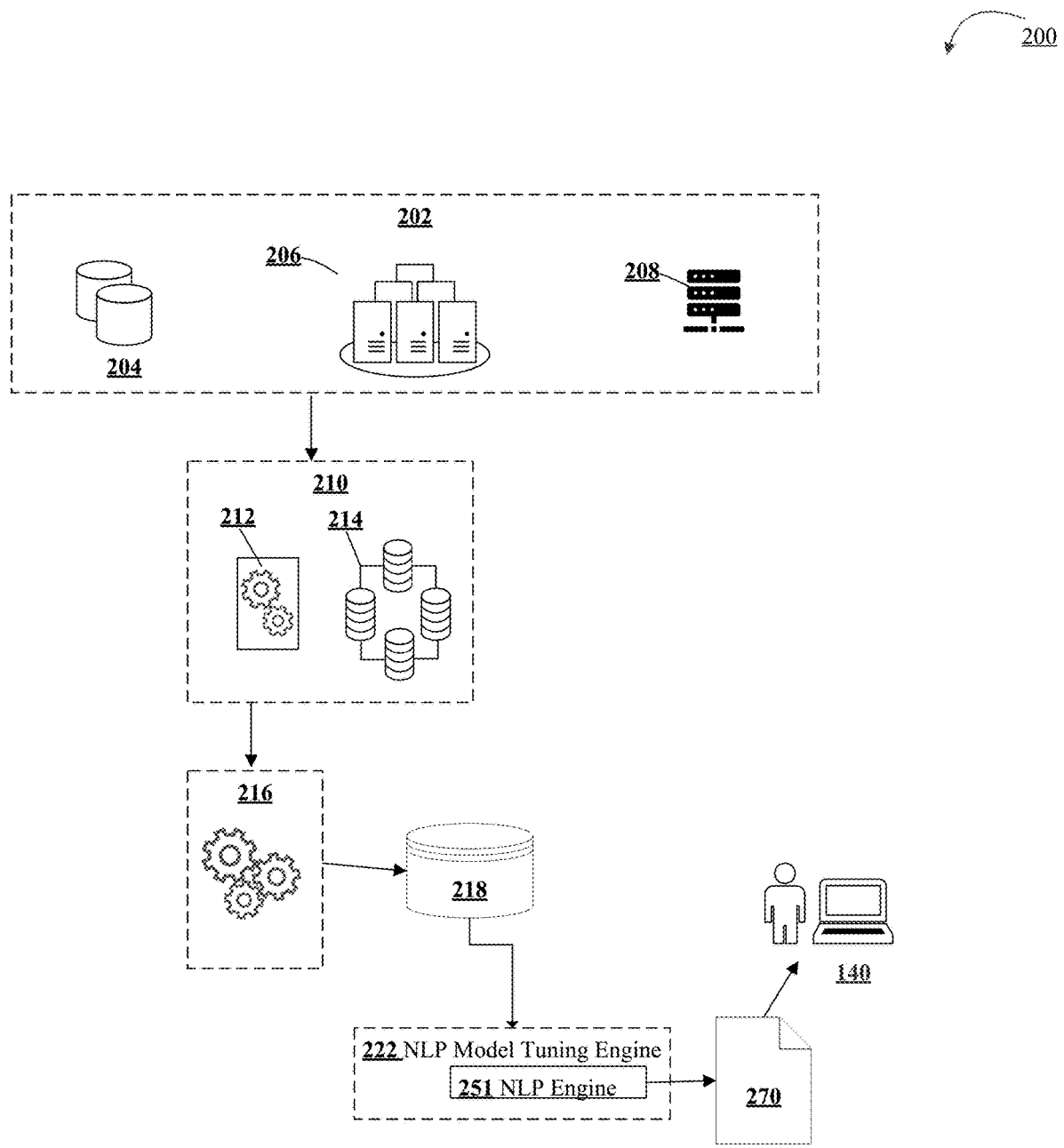
Figure 3:
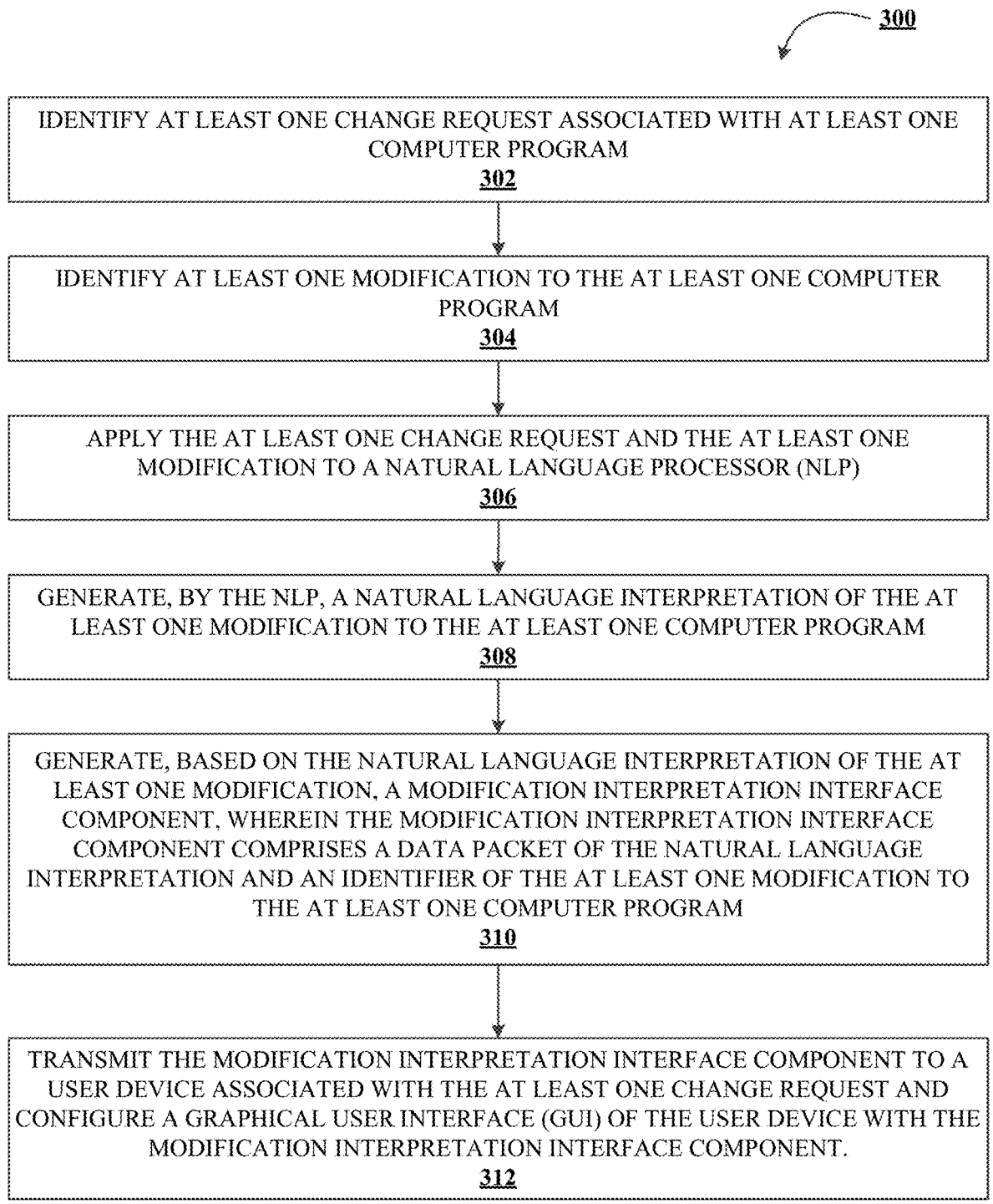
Figure 4:
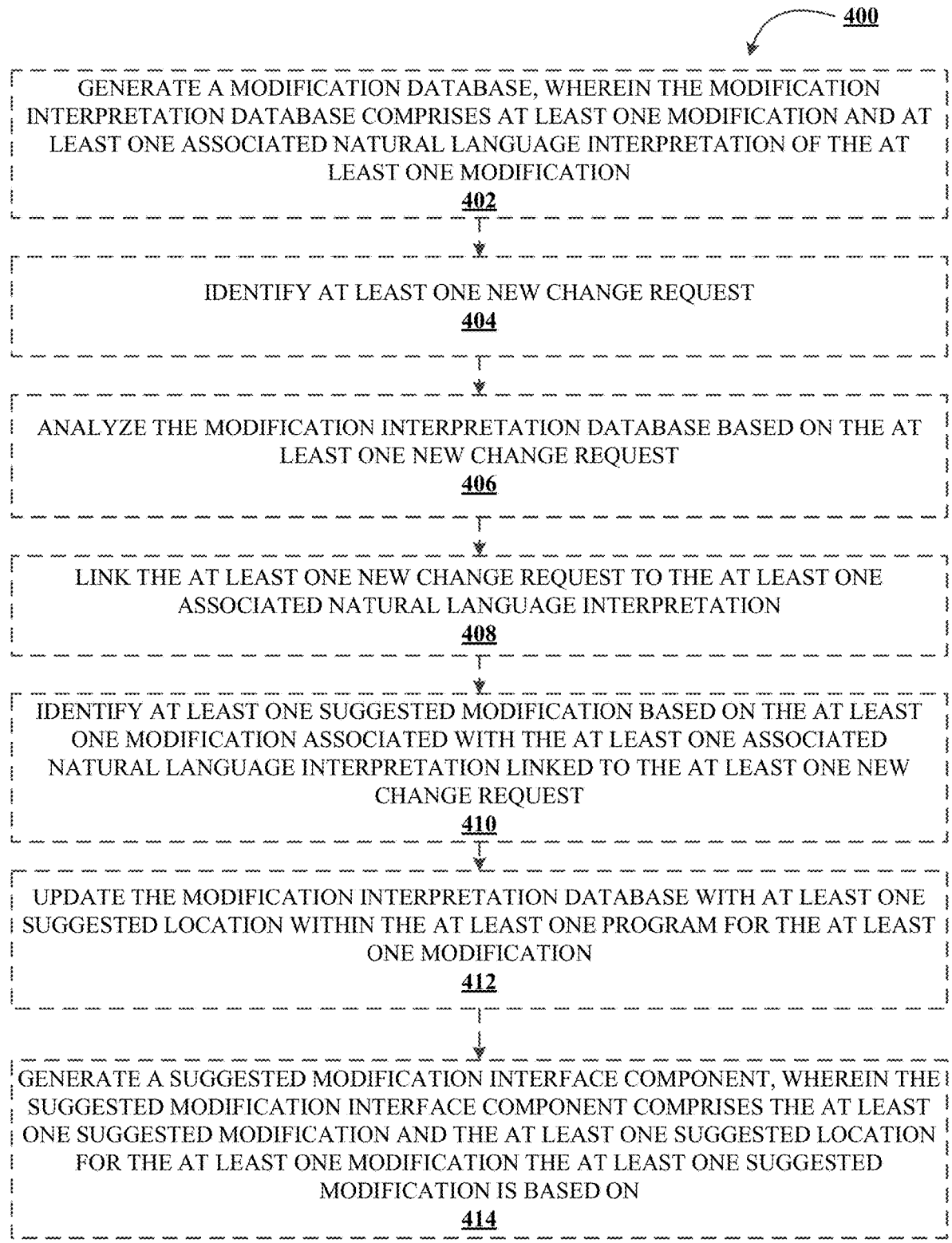
Figure 5:
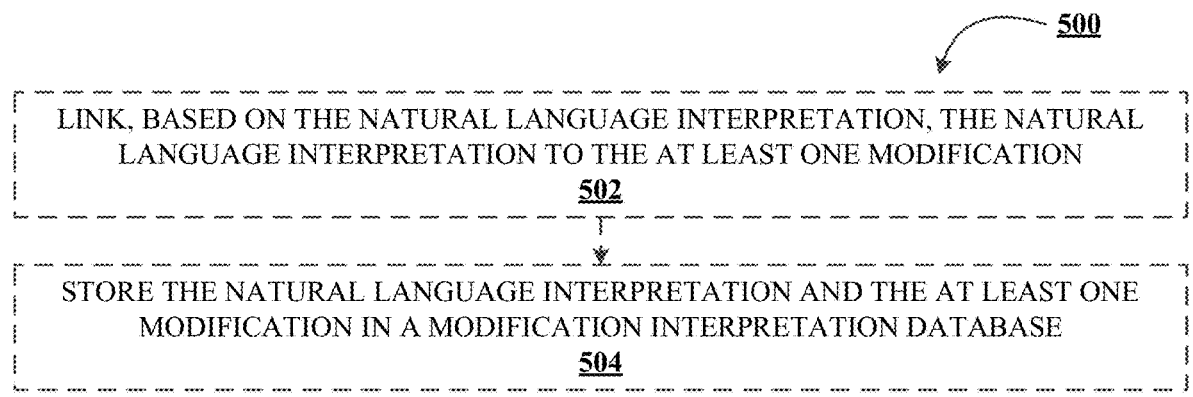
Figure 6:
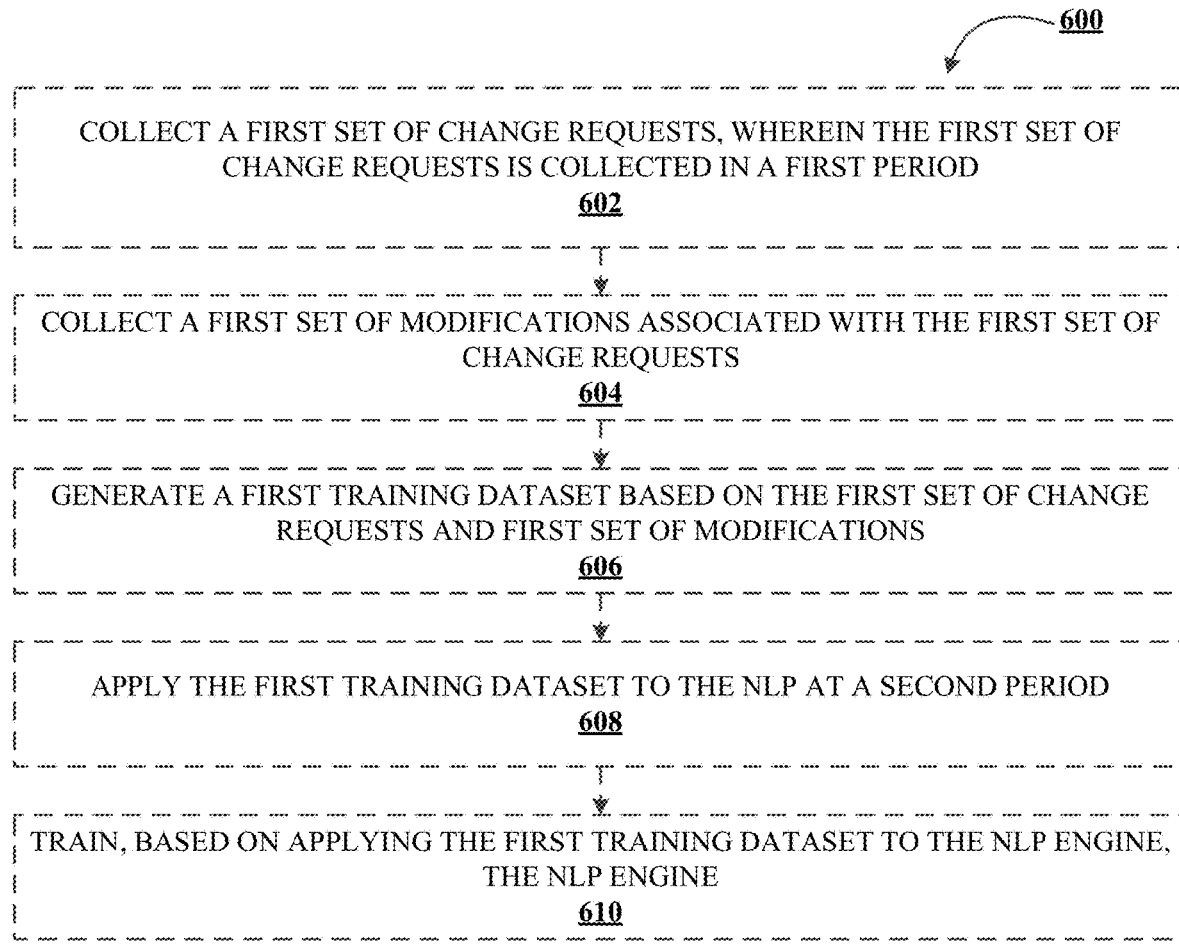
Figure 7:
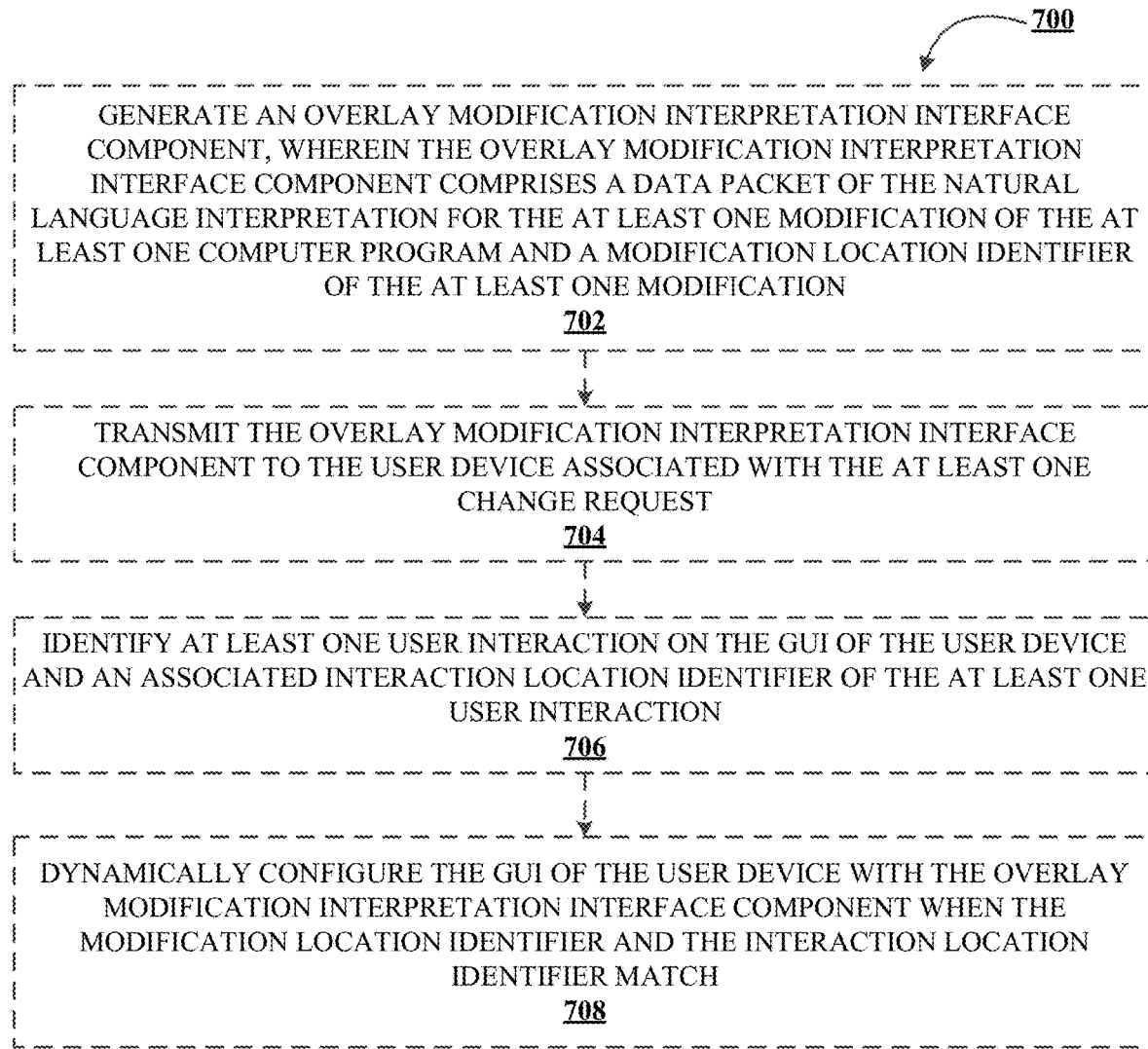

FIGS. 1A-1C illustrates technical components of an exemplary distributed computing environment for implementing natural language processing to determine natural language from computer programming language in an electronic environment, in accordance with an embodiment of the disclosure;

FIG. 2 illustrates technical components of an exemplary natural language processing (NLP) engine, in accordance with an embodiment of the disclosure;

FIG. 3 illustrates a process flow for implementing natural language processing to determine natural language from computer programming language, in accordance with an embodiment of the disclosure; in accordance with an embodiment of the disclosure;

FIG. 4 illustrates a process flow for generating a suggested modification interface component, in accordance with an embodiment of the disclosure;

FIG. 5 illustrates a process flow for storing the natural language interpretation and the at least one modification in a modification interpretation database, in accordance with an embodiment of the disclosure;

FIG. 6 illustrates a process flow for training the NLP engine, in accordance with an embodiment of the disclosure; and FIG. 7 illustrates a process flow for dynamically configure a GUI of a user device with an overlay modification interpretation interface component, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Computer programs and their associated developments/changes occur more and more in today's computer-centric world. Such computer programs play a vital role in humans' day to day lives today, and when those computer programs have identified problems, it becomes very difficult to not only fix those problems but also to relay how the problems have been fixed to laypeople. Thus, there exists a need for a system to accurately, efficiently, and dynamically determine natural language from computer programming language (and the reverse thereof) both for the purpose of fixing computer programs and for the purpose of automatically describing how the computer programs have been fixed.

Thus, such a need for a system, like the computer language interpretation system described herein, is needed that will dynamically and in real time determine natural language interpretations of computer programming language, such as in modifications implemented on computer programs by using a trained NLP engine. Accordingly, the present disclosure provides for the identification of at least one change request (e.g., such a change request from a layperson or non-developer) associated with at least one computer program; the identification of at least one modification to the at least one computer program (such as a modification in response to the change request and/or a modification not in response to the change request); the application of the at least one change request and the at least one modification to a natural language processor (NLP) engine; and the generation, by the NLP engine, of a natural language interpretation (e.g., a layperson description of the modification) of the at least one modification to the at least one computer program. Further, the computer language interpretation system may provide for a generation, based on the natural language interpretation of the at least one modification, a modification interpretation interface component, wherein the modification interpretation interface component comprises a data packet of the natural language interpretation and an identifier of the at least one modification to the at least one computer program; and the transmission the modification interpretation interface component to a user device associated with the at least one change request and configure a graphical user interface (GUI) of the user device with the modification interpretation interface component.

What is more, the present disclosure provides a technical solution to a technical problem. As described herein, the technical problem includes the accurate, efficient, and dynamic determination of natural language from computer programming language, and the reverse thereof. The technical solution presented herein allows for a computer language interpretation system which improves over existing solutions in its automatic, accurate, efficient, and dynamic determination of natural language from computer programming language and its ability to generate computer programming language from natural language. In particular, the computer language interpretation system is an improvement over existing solutions to the determination of natural language from computer programming language, (i) with fewer steps to achieve the solution, thus reducing the amount of computing resources, such as processing resources, storage resources, network resources, and/or the like, that are being used (e.g., such as through the use of a trained NLP engine); (ii) providing a more accurate solution to problem, thus reducing the number of resources required to remedy any errors made due to a less accurate solution; (iii) removing manual input and waste from the implementation of the solution, thus improving speed and efficiency of the process and conserving computing resources (e.g., through the use of an NLP engine); (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for implementing natural language processing to determine natural language from computer programming language in an electronic environment 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary Natural Language Processing (NLP) subsystem architecture 200, in accordance with an embodiment of the disclosure. The NLP subsystem 200 may include a data acquisition engine 202, data ingestion engine 210, data pre-processing engine 216, NLP model tuning engine 222, inference engine 236, and NLP engine 251.

The data acquisition engine 202 may identify various internal and/or external data sources to generate, test, and/or integrate new features for training the NLP engine 251 (such as by gathering at least one unstructured datasets like that shown in as datasets 206). These internal and/or external data sources 204, 206, and 208 may be initial locations where the data originates or where physical information is first digitized (such as within a database, such as a database of change requests, modifications, and/or the like). The data acquisition engine 202 may identify the location of the data and describe connection characteristics for access and retrieval of data.

In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include databases associated with computer programming modifications by development teams and their associated change requests that precipitated the modifications, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. In some embodiments, and since the data may come from different places, it may need to be cleansed and transformed so that it can be analyzed together with data from other sources, such as by cleansing the data of non-important text such as periods (".") and/or the like. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In natural language processing, the quality of data and the useful information that can be derived therefrom directly affects the ability of the natural language processing engine 251. The data pre-processing engine 216 may implement advanced integration and processing steps needed to prepare the data for NLP execution. This may include modules to perform any upfront, data transformation to consolidate the data into alternate forms by changing the value, structure, or format of the data using generalization, weightage values, fuzzy the terms of the unstructured datasets, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. In some embodiments, the training data 218 may comprise pre-labeled modifications, natural language interpretations, and/or the like. Further, and in some embodiments, the training data 218 may be pre-labeled by users associated with the development team of the computer program(s) and/or by a user that input the change requests. Feature extraction and/or selection is a process of dimensionality reduction by which an initial set of data is reduced to more manageable groups for processing. In some embodiments, the training data 218 may require further enrichment. For example, in supervised learning, the training data is enriched using one or more meaningful and informative labels to provide context so the NLP engine 251 can learn from it. In contrast, unsupervised learning uses unlabeled data to find patterns in the data, such as inferences or clustering of data points, such as by being trained on non-labeled change requests and associated modifications.

An NLP engine tuning engine 222 may be used to train the NLP engine 251 using the training data 218 to make predictions or decisions without explicitly being programmed to do so. The NLP engine 251 represents what was learned by a selected machine learning algorithm 220 and represents the rules, numbers, and any other algorithm-specific data structures required for classification.

In some embodiments, the NLP engine 251 may include machine learning supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the NLP engine 251, the NLP tuning engine 222 may repeatedly execute cycles of experimentation, testing, and tuning to optimize the performance of the NLP engine 251 and refine the results in preparation for deployment of those results for consumption or decision making. To this end, the NLP tuning engine 222 may vary hyperparameters each iteration, run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained NLP engine 251 is one whose hyperparameters are tuned and accuracy maximized.

The trained NLP engine 251, similar to any other software application output, can be persisted to storage, file, memory, or application, or looped back into the processing component to be reprocessed. More often, the trained NLP engine 251 is deployed into an existing production environment to make accurate decisions on unstructured data based on live data (e.g., unstructured datasets and input data). For instance, such an unstructured dataset/a plurality of future unstructured datasets may be input to the training NLP engine 251 (which includes parsing the terms of the unstructured dataset(s), determining the meaning of each of the modifications and their purposes within the computer program, the meaning of the change requests, and/or the like. Further, and based on the structured dataset generated by the trained NLP engine 251, the computer language interpretation system may generate an interface component (e.g., a modification interpretation database, and/or the like).

It will be understood that the embodiment of the NLP subsystem 200 illustrated in FIG. 2 is exemplary and that other embodiments may vary. As another example, in some embodiments, the NLP subsystem 200 may include more, fewer, or different components.

FIG. 3 illustrates a process flow 300 for implementing natural language processing to determine natural language from computer programming language in an electronic environment, in accordance with an embodiment of the disclosure. In some embodiments, a system (e.g., similar to one or more of the systems described herein with respect to FIGS. 1A-1C) may perform one or more of the steps of process flow 300. For example, a computer language interpretation system (e.g., the system 130 described herein with respect to FIG. 1A-1C) may perform the steps of process 300. In some embodiments, an NLP engine (e.g., such as the NLP engine shown in FIG. 2) may perform some or all of the steps described in process flow 300.

As shown in block 302, the process flow 300 may include the step of identifying at least one change request associated with at least one computer program. In some embodiments, the computer language interpretation system may identify at least one change request for at least one computer program by receiving a change request input by a user at a user device (such as a mobile device, desktop, tablet, and/or the like) which indicates a particular change the user would like to happen to the computer program. Such a change may comprise an indication of a problem (such as a problem with the computer program's configuration of a graphical user interface (GUI), a computer program's request of information, a computer program's other such procedures and protocols, and/or the like).

In some embodiments, the computer language interpretation system itself may receive the at least one change request from a user device, such as a user device associated with a user of a company team, a user of a non-web-development team, a client user account of the computer program, and/or the like. In some embodiments, the computer language interpretation system may intercept the at least one change request before it reaches the intended recipient, such as a user account and/or user device associated with a developer of the computer program. In some embodiments, the computer language interpretation system may track each of the change request(s) it identifies and allow each of the change requests through to the developer user account, and may additionally collect data from the developer user in response to the at least one change request (e.g., such as a modification to the computer program like that described below).

As used herein, a change request refers to a natural language request input by a user (such as a non-development user) for a particular change to a computer program, application, and/or the like. Such a change request may then be transmitted to an implementation team and/or individual, such as a computer programming developer or development team for implementing computer programming language to meet the at least one change request (e.g., solve the change request, follow the change request, and/or the like). In some embodiments, the at least one change request may be associated (or identify) a plurality of computer programs that should be changed, and/or the computer language interpretation system may identify a plurality of change requests for a plurality of computer programs at a single period.

As shown in block 304, the process flow 300 may include the step of identifying at least one modification to the at least one computer program. In some embodiments, the computer language interpretation system may identify at least one modification to the at least one computer program, whereby the at least one modification as referred to herein comprises at least one change to the computer program, application, and/or the like. In some embodiments, the computer language interpretation system may only identify the at least one modification once the at least one change request is received and/or identified. In some embodiments, the computer language interpretation system may track each version of the computer program(s) even when at least one change request is not identified or received for the computer program(s), such that the computer language interpretation system may keep a detailed record of each of the modification(s) implemented on each of the computer program(s).

In some embodiments, the at least one modification may be directly related and based on the at least one change request (in response to the change request(s)) or may be on its own and not related to a change request. In some embodiments, the computer language interpretation system may additionally and/or alternatively identify all the modifications to the computer program(s), including those that may be directly related or based on the change requests and/or those that may not be directly related or based on the change requests. In some embodiments, the computer language interpretation system may track each version of the computer program (e.g., between each modification and/or set of modifications, such as those modifications made between savings of the computer program file, modifications made between publications, and/or modifications made between each instance of transmitting the updated computer program to a review team, such as the team and/or individual that input the change request(s)), and based on tracking of the computer program(s), may generate a list of modifications implemented on the computer program(s) between each change request(s) received and identified. In this manner, the sender of the change request(s) may view both the modifications implemented in response to the change request(s) and the modifications—if any—that are not in response to any change request(s) (such as errant modifications that should not be in the computer program at all).

As shown in block 306, the process flow 300 may include the step of applying the at least one change request and the at least one modification to a natural language processor (NLP) engine (e.g., an NLP engine like that shown in FIG. 2).

Application of this data to the NLP engine, once the NLP engine has been at least initially trained (like that described below with respect to FIG. 6), allows for the trained NLP engine to determine and generate a natural language interpretation for each of the modifications, including those that may have been related to a change request and those that may not have been related to a change request. In some embodiments, the NLP engine may parse the data of the at least one change request(s) and parse the data of each of the modification(s) of the at least one computer program in order to determine which modification is associated with each change request(s). In some embodiments, the computer language interpretation system may determine—based on identifying each of the modifications and their associated change requests-which modifications are not associated with at least one change request and may, thus, generate new natural language interpretations of the modifications without additional disclosure and identification of an associated change request.

As shown in block 308, the process flow 300 may include the step of generating—by the NLP engine—a natural language interpretation of the at least one modification to the at least one computer program. In some embodiments, the computer language interpretation system may generate—by the NLP engine—a natural language interpretation of the modification(s) within the computer program(s), whereby the natural language interpretation refers to a natural language or layman's explanation of the modification(s) from the computer programming language within the computer program(s). For instance, the natural language interpretation as used herein refers to a text data comprising a layman's description of the computer programming modification(s), and which may be linked and/or mapped to one modification within the computer program(s) or a plurality of modifications within the computer program(s) based on the purpose behind the modification(s). For instance, and where the purpose behind the modification(s) is to solve a problem identified in a change request, the computer language interpretation system may determine there are multiple modifications either in sequence and/or in a plurality of locations that are each designed to solve the problem or solve a portion of the problem.

In some embodiments, and where a modification associated with one change request comprises multiple lines of code (which may include or not include consecutive or sequential lines of code) the computer language interpretation system—in generating the at least one natural language interpretation—may generate a natural language interpretation that does not exactly match the at least one change request, but instead breaks down each of the lines of the modifications within the computer program and how each line—individually—is used to meet the at least one change request.

In some embodiments, and where the at least one modification is based on and/or directly related to the change request(s), the computer language interpretation system may base its natural language interpretation based on the language of the change request(s) (e.g., by copying some or all of the change request(s) language, and/or by generating its own natural language interpretation only loosely based off the change request(s) language). In some embodiments, and where there is no associated change request(s) for the at least one modification, the computer language interpretation system may generate its own natural language interpretation via the NLP engine and based on prior training of the NLP engine.

As shown in block 310, the process flow 300 may include the step of generating—based on the natural language interpretation of the at least one modification—a modification interpretation interface component, wherein the modification interpretation interface component comprises a data packet of the natural language interpretation and an identifier of the at least one modification to the at least one computer program. In some embodiments, the computer language interpretation system may generate a modification interpretation interface component which may be transmitted to a user device (such as a user device of a user account associated with the change request(s)) and may be used to configure the graphical user interface (GUI) of the user device to display the data of the natural language interpretation(s), the modification(s), the computer program (and its code), and/or the change request(s).

As used herein, the modification interpretation interface component for the at least one modification(s) within a program code comprises computer-readable program code of the data for the at least one modification and the associated natural language interpretation(s). In some embodiments, the modification interpretation interface component may additionally comprise at least one identifier for each off the at least one modification(s), whereby such an identifier may comprise a location identifier of the modification within the computer program (e.g., a line of code, a term of the code, and/or the like), an identifier of the particular computer program (e.g., identifying a file), an identifier of the developer user of the modification (e.g., team identifier, a developer user account of the computer program, and/or the like), and/or the like.

As shown in block 312, the process flow 300 may include the step of transmitting the modification interpretation interface component to a user device associated with the at least one change request and configure a graphical user interface (GUI) of the user device with the modification interpretation interface component. In some embodiments, the computer language interpretation system may transmit the data packet of the modification interpretation interface component to a user device in order to configure the GUI of the user device with the modification interpretation interface component and its associated data. Additionally, and/or alternatively, the modification interpretation interface component may comprise data and configurations for the other interface components like that described herein with respect to FIGS. 4 and 7.

FIG. 4 illustrates a process flow 400 for generating a suggested modification interface component, in accordance with an embodiment of the disclosure. In some embodiments, a system (e.g., similar to one or more of the systems described herein with respect to FIGS. 1A-1C) may perform one or more of the steps of process flow 400. For example, a computer language interpretation system (e.g., the system 130 described herein with respect to FIG. 1A-1C) may perform the steps of process flow 400. In some embodiments, an NLP engine (e.g., such as the NLP engine shown in FIG. 2) may perform some or all of the steps described in process flow 400.

In some embodiments, and as shown in block 402, the process flow 400 may include the step of generating a modification interpretation database, wherein the modification interpretation database comprises at least one modification and at least one associated natural language interpretation of the at least one modification. For example, the modification interpretation database as used herein refers to a database of all the modifications associated with the computer language interpretation system (e.g., tracked by the computer language interpretation system) and all the generated natural language interpretations associated with the modifications. In some embodiments, the modification interpretation database may additionally comprise all the change requests associated with the modifications identified by the computer language interpretation system, identifiers such as but not limited to a developer identifier(s) (e.g., developer user account identifiers), a location identifier(s) for each of the modifications within the computer program, computer program identifier(s) for each of the modifications, and/or the like.

In some embodiments, and as shown in block 404, the process flow 400 may include the step of identifying at least one new change request. For instance, the computer language interpretation system may identify at least one new change requests based on at least one of receiving—by the computer language interpretation system itself—the change request(s), by identifying and/or tracking each of the change request(s) received by a user account within the same network of the computer language interpretation system (or connected the computer language interpretation system), and/or the like. In each of the above instances, the computer language interpretation system may identify the change request(s) in real time (i.e., at a current time when it is the change request(s) is first transmitted). In some embodiments, the computer language interpretation system may identify change request(s) that have been recently received but not yet addressed with modification(s), and/or those change request(s) that have only been recently addressed with modification(s) but where the modification(s) have not yet had natural language interpretation(s) generated for them.

In some embodiments, and as shown in block 406, the process flow 400 may include the step of analyzing the modification interpretation database based on the at least one new change request. For example, the computer language interpretation system may analyze the modification interpretation database based on the identified change request(s) (newly identified change request(s)) to identify a previously generated natural language interpretation that is similar to and/or matches the at least one new change request. For instance, the computer language interpretation system may analyze the modification interpretation database based on the identification of the at least one new change request, whereby the one new change request may be used as a baseline and/or key to find at least one modification that will work to meet the at least one new change request, based on linking the at least one new change request to a previously generated natural language interpretation and its associated modification.

In some embodiments, the computer language interpretation system may use the at least one new change request as the baseline in order to match to at least one previously identified change request, and identify an associated modification to the at least one previously identified change request that matches and/or is similar to the new change request.

In some embodiments, and as shown in block 408, the process flow 400 may include the step of linking the at least one new change request to the at least one associated natural language interpretation. For example, the computer language interpretation system may link and/or associated the at least one new change request to the at associated natural language interpretation that matches and/or is similar to the new change request. In some embodiments, and based on the linking and/or association, the computer language interpretation system may additionally store each of the linked and/or associated new change requests within the modification interpretation database with the natural language interpretations to keep an up-to-date real time record of the new change requests and associated natural language interpretations (and associated modifications, which may be suggested by the computer language interpretation system to meet the at least one new change request).

In some embodiments, and as shown in block 410, the process flow 400 may include the step of identifying at least one suggested modification based on the at least one modification associated with the at least one associated natural language interpretation linked to the at least one new change request. For example, the computer language interpretation system may identify the at least one suggested modification for the at least one new change request based on the similar and/or same identified natural language interpretation to the at least one new change request, whereby the at least one suggested modification is associated with the identified natural language interpretation (i.e., the natural language interpretation generated for the at least one modification of the suggested modification).

In some embodiments, and as shown in block 412, the process flow 400 may include the step of updating the modification interpretation database with at least one suggested location within the at least one program for the at least one modification. For example, the suggested location refers to a location of a line of code (e.g., a number line of code), a location of a section of code (e.g., a location of a particular term within the code), and/or the like within the computer program. Thus, and based on the location identified by the computer language interpretation system, the computer language interpretation system may generate and/or identify a location identifier based on the location of the line of the code, the location of the section of the code, and/or the like with a location identifier. Further, and based on this location identifier, the computer language interpretation system may update the modification interpretation database with the location identifier and associated the location identifier with the modification.

Additionally, and based on the location identifier of the modification, the computer language interpretation system may generate a suggested location of the suggested modification for the new change request(s). Such a suggested location of the suggested modification may match exactly and/or be similar to the location of the modification as it was previously implemented in the computer program. In some embodiments, the computer language interpretation system may base the suggested location on the computer programming code immediately before and/or immediately after the location of the modification as it was previously implemented, whereby the computer language interpretation system may use such data to generate a suggested location based on the context of the modification.

In some embodiments, and as shown in block 414, the process flow 400 may include the step of generating a suggested modification interface component, wherein the suggested modification interface component comprises the at least one suggested modification and the at least one suggested location for the at least one modification the at least one suggested modification is based on. For example, the computer language interpretation system may generate a suggested modification interface component comprising the data of the at least on suggested modification and the associated suggested location, whereby the suggested location is based on the (previous) modification (and its location). Additionally, and as described above, the suggested modification interface may comprise a data packet of the suggested modification and the suggested location which may be transmitted to a user device for configuration of the user device's GUI.

FIG. 5 illustrates a process flow 500 for storing the natural language interpretation and the at least one modification in a modification interpretation database, in accordance with an embodiment of the disclosure. In some embodiments, a system (e.g., similar to one or more of the systems described herein with respect to FIGS. 1A-1C) may perform one or more of the steps of process flow 500. For example, a computer language interpretation system (e.g., the system 130 described herein with respect to FIG. 1A-1C) may perform the steps of process flow 500. In some embodiments, an NLP engine (e.g., such as the NLP engine shown in FIG. 2) may perform some or all of the steps described in process flow 500.

In some embodiments, and as shown in block 502, the process flow 500 may include the step of linking—based on the natural language interpretation—the natural language interpretation to the at least one modification. For example, the computer language interpretation system may link the natural language interpretation to the at least one modification that is generated by the computer language interpretation system (such as the natural language interpretation generated in FIG. 3) to at least one modification, such as a modification stored in a modification interpretation database. In this manner, the computer language interpretation system may keep a complete record of each of the natural language interpretations generated and the associated modifications each of the natural language interpretations are based on.

In some embodiments, and as shown in block 504, the process flow 500 may include the step of storing the natural language interpretation and the at least one modification in a modification interpretation database. Thus, and as used herein, the computer language interpretation system may link the natural language interpretation generated by the computer language interpretation system to the associated at least one modification and/or portions of the at least one modification within a database and store each of the natural language interpretations with each of the modifications in a modification interpretation database. Whereby such a modification interpretation database may be used for further training of the NLP engine, such as through the process described below with respect to FIG. 6.

FIG. 6 illustrates a process flow 600 for training the NLP engine, in accordance with an embodiment of the disclosure. In some embodiments, a system (e.g., similar to one or more of the systems described herein with respect to FIGS. 1A-1C) may perform one or more of the steps of process flow 600. For example, a computer language interpretation system (e.g., the system 130 described herein with respect to FIG. 1A-1C) may perform the steps of process 600. In some embodiments, an NLP engine (e.g., such as the NLP engine shown in FIG. 2) may perform some or all of the steps described in process flow 600.

In some embodiments, and as shown in block 602, the process flow 600 may include the step of collecting a first set of change requests, wherein the first set of change requests is collected in a first period. For example, the computer language interpretation system may collect a first set of change requests from a previous time period, such as a first period. Such a first set of change requests may be based on previously submitted change requests from a user device, which have since been met or addressed by modifications to computer programs. In some embodiments, the first set of change requests may be collected from a database, from a storage component/container of previous change requests, and/or the like. In some embodiments, the database of the first set of change requests may be stored in a system connected to the computer language interpretation system, such as by a network, and/or may be stored in a system or computing device directly connected to the computer language interpretation system, such as within the same server as the computer language interpretation system, and/or the change requests may be from one individual, one team, one entity, a plurality of individuals, a plurality of teams, a plurality of entities, and/or the like.

In some embodiments, and as shown in block 604, the process flow 600 may include the step of collecting a first set of modifications associated with the first set of change requests. For example, the computer language interpretation system may collect a first set of modifications that were in response to the first set of change requests. In some embodiments, the computer language interpretation system may collect a first set of modification that are unrelated to the first set of change requests, but may have been pre-labeled by a user with at least one natural language interpretation for each of the modifications. Such modifications may comprise one type of computer programming language, and/or a plurality of computer programming languages such that the NLP engine is trained for a plurality of computer programming languages. For instance, the NLP engine may be trained on at least one set of previous modifications for a plurality of computer programs, wherein the plurality of computer programs comprises a plurality of programming languages.

In some embodiments, and as shown in block 606, the process flow 600 may include the step of generating a first training dataset based on the first set of change requests and first set of modifications. For example, the computer language interpretation system may generate a first training dataset based on combining the at least first set of change requests and the first set of modifications. In some embodiments, the first training dataset may additionally comprise other such data such as but not limited to pre-labeled natural language interpretations, pre-labeled change requests based on the modifications, identifiers, and/or the like. Further, and in some embodiments, the computer language interpretation system may additionally generate a plurality of training datasets based on collecting at least a plurality of sets of change requests and a plurality of sets of modifications at a plurality of times.

In some embodiments, the first training dataset may comprise a first set of pre-tagged attributes (e.g., indicating that the modifications of the first training dataset are based on or in response to a change request of the first set of change requests) of the first set of modifications, and wherein the first set of pre-tagged attributes comprise at least one of an association with the first set of change requests or a disassociation with the first set of change requests. For instance, a disassociation attribute for a modification of the first training dataset may indicate to the [ ] system that the modification is not based on or related to any change request.

In some embodiments, the NLP engine is trained based on at least one set of previous modifications to the at least one computer program, and wherein the at least one set of previous modifications is generated by at least one developer, at least one developer team, or a plurality of developer teams. For instance, each of the training datasets used to train the NLP may be of modification generated by one developer, by one team of developers, and/or by a plurality of developer teams, and/or the like.

In some embodiments, and as shown in block 608, the process flow 600 may include the step of applying the first training dataset to the NLP engine at a second period. For instance, the computer language interpretation system apply at least the first training dataset to the NLP train to change the NLP engine at a first instance (e.g., at a second period after the first set of change requests have been collected). In some embodiments, and as mentioned above, the computer language interpretation system may additionally apply a plurality of training datasets to the NLP engine such that the NLP engine is constantly and continuously trained on up-to-date data regarding change requests, natural language interpretations, and modifications.

In some embodiments, and as shown in block 610, the process flow 600 may include the step of training-based on applying the first training dataset to the NLP engine, the NLP engine. For example, the computer language interpretation system may train—based on applying at least the first training dataset to the NLP engine—the NLP engine to generate at least the natural language interpretation(s) of the modification(s) to the computer program(s). Thus, and as described herein, the NLP engine may be trained on a plurality of modifications across different computer programming languages, such that the NLP engine is trained to generate natural language interpretations regardless of the computer programming language. Additionally, and as understood by a person of skill in the art, based on continuously training the NLP engine across different computer programming languages, the NLP engine may be trained on the constant changes that may occur within the computer programs, computer programming languages, and/or the like. Thus, such constant changes and modifications require a constant and dynamic training of the NLP engine, which will improve the NLP engine for more accurate and efficient generation of natural language interpretations of modifications.

Additionally, and in some embodiments, the NLP engine may be trained to generate computer programming language (e.g., modifications to the computer programs) in the reverse by identifying change requests and automatically generating—by the NLP engine—at least one modification to address the change request(s). Such an implementation of the trained NLP engine is understood by one of skill in the art as being possible based on the description herein.

FIG. 7 illustrates a process flow 700 for dynamically configure a GUI of a user device with an overlay modification interpretation interface component, in accordance with an embodiment of the disclosure. In some embodiments, a system (e.g., similar to one or more of the systems described herein with respect to FIGS. 1A-1C) may perform one or more of the steps of process flow 700. For example, a computer language interpretation system (e.g., the system 130 described herein with respect to FIG. 1A-1C) may perform the steps of process 700. In some embodiments, an NLP engine (e.g., such as the NLP engine shown in FIG. 2) may perform some or all of the steps described in process flow 700.

In some embodiments, and as shown in block 702, the process flow 700 may include the step of generating an overlay modification interpretation interface component, wherein the overlay modification interpretation interface component comprises a data packet of the natural language interpretation for the at least one modification of the at least one modification of the at least one computer program and a modification location identifier of the at least one modification. For example, the computer language interpretation system may generate an overlay modification interpretation interface component, whereby the overlay modification interpretation interface component may be similar to the modification interpretation interface component of FIG. 3 in that it may comprise the natural language interpretation for the at least one modification. However, and additionally, the overlay modification interpretation interface component may be overlayed as a pop-up and configure all or a portion of a GUI on a user device based on the user's interaction with particular elements of the GUI when viewing the computer program comprising the at least one modification. For instance, and when the user swipes and/or clicks on a particular modification in a computer program, the overlay modification interpretation interface component may "pop-up" on the GUI of the user to showcase at least the natural language interpretation of the modification the user has currently swiped over and/or clicked. In this manner, the overlay modification interpretation interface component may dynamically and automatically configure the GUI of the user device based on the interactions tracked by the computer language interpretation system as the user interacts with the computer program.

In some embodiments, and as shown in block 704, the process flow 700 may include the step of transmitting the overlay modification interpretation interface component to the user device associated with the at least one change request. For example, the computer language interpretation system may transmit the overlay modification interpretation interface component to a user device, such as the user device associated with the user account that submitted the change request(s) which has a newly generated modification(s) to meet the change request(s). Thus, and by way of example, the computer language interpretation system may update the user of the change request that the issue of the change request has likely been solved and indicate where, in the computer program, at least one modification to address the change request(s) may be found.

In some embodiments, and as shown in block 706, the process flow 700 may include the step of identifying at least one user interaction on the GUI of the user device and an associated interaction location identifier of the at least one user interaction. For example, the computer language interpretation system may identify at least one user interaction on the GUI of the user device, whereby such an interaction may comprise a scrolling over of an element on the GUI (such as a portion of code in the computer program), a clicking of an element on the GUI, and/or the like. Each of the interactions may additionally be used by the computer language interpretation system to generate an interaction location identifier within the code of the computer program, whereby the interaction location may comprise an identifier of the line of code and/or a term of the code that the user interacted with.

In some embodiments, and as shown in block 708, the process flow 700 may include the step of dynamically configuring the GUI of the user device with the overlay modification interpretation interface component when the modification location identifier and the interaction location identifier match. For example, the computer language interpretation system may dynamically configure the GUI of the user device with the overlay modification interpretation interface component such that the natural language interpretation of the modification the user is currently interacting with pops up on the GUI of the user device at the time the user is interacting with the modification.

Further, and based on this overlay modification interpretation interface component, the computer language interpretation system may allow a user to directly view each of the modifications, individually, and determine each of their plain meaning/natural language interpretations at an itemized and individual level. Such an individual level of review may allow for greater security in the computer program (such as before the computer undergoes production), by allowing for individual review of potentially errant code that should not be part of the computer program. For instance, and where a modification is not based on a change request, the reviewing user may determine that the modification should be in the computer program at all after reviewing the natural language interpretation.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for implementing natural language processing (NLP) to determine natural language from computer programming language, the system comprising:
a memory device with computer-readable program code stored thereon;
at least one processing device, wherein executing the computer-readable code is configured to cause the at least one processing device to perform the following operations:
identify at least one change request associated with at least one computer program;
identify at least one modification to the at least one computer program;
apply the at least one change request and the at least one modification to a natural language processor (NLP) engine, wherein the NLP engine is trained by:
collecting a first set of change requests, wherein the first set of change requests is collected in a first period,
collecting a first set of modifications associated with the first set of change requests,
generating a first training dataset based on the first set of change requests and first set of modifications,
applying the first training dataset to the NLP engine at a second period, and
training, based on applying the first training dataset to the NLP engine, the NLP engine;
generate, by the NLP engine, a natural language interpretation of the at least one modification to the at least one computer program;
generate, based on the natural language interpretation of the at least one modification, a modification interpretation interface component, wherein the modification interpretation interface component comprises a data packet of the natural language interpretation and an identifier of the at least one modification to the at least one computer program; and
transmit the modification interpretation interface component to a user device associated with the at least one change request and configure a graphical user interface (GUI) of the user device with the modification interpretation interface component.

2. The system of claim 1, the system further comprising:
generate a modification interpretation database, wherein the modification interpretation database comprises at least one modification and at least one associated natural language interpretation of the at least one modification;
identify at least one new change request;
analyze the modification interpretation database based on the at least one new change request;
link the at least one new change request to the at least one associated natural language interpretation; and
identify at least one suggested modification based on the at least one modification associated with the at least one associated natural language interpretation linked to the at least one new change request.

3. The system of claim 2, the system further comprising:
update the modification interpretation database with at least one suggested location within the at least one computer program for the at least one modification; and
generate a suggested modification interface component, wherein the suggested modification interface component comprises the at least one suggested modification and the at least one suggested location for the at least one modification the at least one suggested modification is based on.

4. The system of claim 2, the system further comprising:
link, based on the natural language interpretation, the natural language interpretation to the at least one modification; and
store the natural language interpretation and the at least one modification in the modification interpretation database.

5. The system of claim 1, wherein the first training dataset comprises a first set of pre-tagged attributes of the first set of modifications, and wherein the first set of pre-tagged attributes comprise at least one of an association with the first set of change requests or a disassociation with the first set of change requests.

6. The system of claim 1, wherein the NLP engine is trained based on at least one set of previous modifications to the at least one computer program, and wherein the at least one set of previous modifications is generated by at least one developer, at least one developer team, or a plurality of developer teams.

7. The system of claim 1, wherein the NLP engine is trained based on at least one set of previous modifications for a plurality of computer programs, wherein the plurality of computer programs comprises a plurality of programming languages.

8. The system of claim 1, the system further comprising:
generate an overlay modification interpretation interface component, wherein the overlay modification interpretation interface component comprises a data packet of the natural language interpretation for the at least one modification of the at least one computer program and a modification location identifier of the at least one modification;
transmit the overlay modification interpretation interface component to the user device associated with the at least one change request;
identify at least one user interaction on the GUI of the user device and an associated interaction location identifier of the at least one user interaction; and
dynamically configure the GUI of the user device with the overlay modification interpretation interface component when the modification location identifier and the interaction location identifier match.

9. A computer program product for implementing natural language processing (NLP) engine to determine natural language from computer programming language, wherein the computer program product comprises at least one non-transitory computer-readable medium having computer-readable program code portions embodied therein, the computer-readable program code portions which when executed by a processing device are configured to cause the processor to perform the following operations:
identify at least one change request associated with at least one computer program;
identify at least one modification to the at least one computer program;
apply the at least one change request and the at least one modification to a natural language processor (NLP) engine, wherein the NLP engine is trained by:
collecting a first set of change requests, wherein the first set of change requests is collected in a first period,
collecting a first set of modifications associated with the first set of change requests,
generating a first training dataset based on the first set of change requests and first set of modifications,
applying the first training dataset to the NLP engine at a second period, and
training, based on applying the first training dataset to the NLP engine, the NLP engine;
generate, by the NLP engine, a natural language interpretation of the at least one modification to the at least one computer program;
generate, based on the natural language interpretation of the at least one modification, a modification interpretation interface component, wherein the modification interpretation interface component comprises a data packet of the natural language interpretation and an identifier of the at least one modification to the at least one computer program; and
transmit the modification interpretation interface component to a user device associated with the at least one change request and configure a graphical user interface (GUI) of the user device with the modification interpretation interface component.

10. The computer program product of claim 9, wherein the processing device is configured to cause the processor to perform the following operations:
generate a modification interpretation database, wherein the modification interpretation database comprises at least one modification and at least one associated natural language interpretation of the at least one modification;
identify at least one new change request;
analyze the modification interpretation database based on the at least one new change request;
link the at least one new change request to the at least one associated natural language interpretation; and
identify at least one suggested modification based on the at least one modification associated with the at least one associated natural language interpretation linked to the at least one new change request.

11. The computer program product of claim 10, wherein the processing device is configured to cause the processor to perform the following operations:
update the modification interpretation database with at least one suggested location within the at least one computer program for the at least one modification; and
generate a suggested modification interface component, wherein the suggested modification interface component comprises the at least one suggested modification and the at least one suggested location for the at least one modification the at least one suggested modification is based on.

12. The computer program product of claim 10, wherein the processing device is configured to cause the processor to perform the following operations:
link, based on the natural language interpretation, the natural language interpretation to the at least one modification; and
store the natural language interpretation and the at least one modification in the modification interpretation database.

13. The computer program product of claim 9, wherein the first training dataset comprises a first set of pre-tagged attributes of the first set of modifications, and wherein the first set of pre-tagged attributes comprise at least one of an associated with the first set of change requests or a disassociation with the first set of change requests.

14. A computer implemented method for implementing natural language processing (NLP) engine to determine natural language from computer programming language, the computer implemented method comprising:
- identifying at least one change request associated with at least one computer program;
- identifying at least one modification to the at least one computer program;
- applying the at least one change request and the at least one modification to a natural language processor (NLP) engine, wherein the NLP engine is trained by:
  - collecting a first set of change requests, wherein the first set of change requests is collected in a first period,
  - collecting a first set of modifications associated with the first set of change requests,
  - generating a first training dataset based on the first set of change requests and first set of modifications,
  - applying the first training dataset to the NLP engine at a second period, and
  - training, based on applying the first training dataset to the NLP engine, the NLP engine;
- generating, by the NLP engine, a natural language interpretation of the at least one modification to the at least one computer program;
- generating, based on the natural language interpretation of the at least one modification, a modification interpretation interface component, wherein the modification interpretation interface component comprises a data packet of the natural language interpretation and an identifier of the at least one modification to the at least one computer program; and
- transmitting the modification interpretation interface component to a user device associated with the at least one change request and configure a graphical user interface (GUI) of the user device with the modification interpretation interface component.

15. The computer implemented method of claim 14, further comprising:
- generating a modification interpretation database, wherein the modification interpretation database comprises at least one modification and at least one associated natural language interpretation of the at least one modification;
- identifying at least one new change request;
- analyzing the modification interpretation database based on the at least one new change request;
- linking the at least one new change request to the at least one associated natural language interpretation; and
- identifying at least one suggested modification based on the at least one modification associated with the at least one associated natural language interpretation linked to the at least one new change request.

16. The computer implemented method of claim 15, the computer implemented method comprising:
- updating the modification interpretation database with at least one suggested location within the at least one computer program for the at least one modification; and
- generating a suggested modification interface component, wherein the suggested modification interface component comprises the at least one suggested modification and the at least one suggested location for the at least one modification the at least one suggested modification is based on.

17. The computer implemented method of claim 15, the computer implemented method comprising:
- linking, based on the natural language interpretation, the natural language interpretation to the at least one modification; and
- storing the natural language interpretation and the at least one modification in the modification interpretation database.

* * * * *